United States Patent
Lin et al.

(10) Patent No.: US 7,233,131 B2
(45) Date of Patent: Jun. 19, 2007

(54) CIRCUIT AND METHOD FOR IMPLEMENTING A MULTI-FUNCTION PIN ON A PWM CONTROLLER CHIP IN A VOLTAGE CONVERTER

(75) Inventors: Pao-Chuan Lin, Lunbei Township, Yunlin County (TW); Chin-Hui Wang, Banchiau (TW); Liang-Pin Tai, Tainan (TW)

(73) Assignee: Richtek Technology Corp., Hsinchu (TW)

( * ) Notice: Subject to any disclaimer, the term of this patent is extended or adjusted under 35 U.S.C. 154(b) by 34 days.

(21) Appl. No.: 11/171,437

(22) Filed: Jul. 1, 2005

(65) Prior Publication Data
US 2006/0002159 A1 Jan. 5, 2006

(30) Foreign Application Priority Data
Jul. 2, 2004 (TW) ............... 93120057 A

(51) Int. Cl.
*G05F 1/44* (2006.01)

(52) U.S. Cl. ............. 323/268; 323/283; 330/297
(58) Field of Classification Search ............. 323/268, 323/259, 275, 344, 282–288, 225, 266; 330/263, 330/297
See application file for complete search history.

(56) References Cited

U.S. PATENT DOCUMENTS
4,808,946 A * 2/1989 Carver et al. ............. 330/297

* cited by examiner

*Primary Examiner*—Rajnikant B. Patel
(74) *Attorney, Agent, or Firm*—Rosenberg, Klein & Lee

(57) ABSTRACT

For a PWM controller chip in a voltage converter to switch a pair of high side and low side switches connected with a phase node therebetween, a circuit comprises a sense resistor connected between a multi-function pin on the PWM controller chip and the phase node, and an enable arrangement, a power sensing arrangement, and an over-current protection arrangement to detect the voltage on the multi-function pin for accomplishing enable function, power sensing, and over-current protection, respectively.

10 Claims, 3 Drawing Sheets

CIRCUIT AND METHOD FOR IMPLEMENTING A MULTI-FUNCTION PIN ON A PWM CONTROLLER CHIP IN A VOLTAGE CONVERTER

FIELD OF THE INVENTION

The present invention is related generally to a Pulse Width Modulation (PWM) controller for a voltage converter, and more particularly, to a circuit and method for implementing a multi-function pin on a PWM controller chip in a voltage converter.

BACKGROUND OF THE INVENTION

In a voltage converter, PWM controller is used to regulate the output voltage of the voltage converter for supplying for an electronic apparatus. FIG. 1 shows a typical voltage converter 10, in which a high side switch 14 and a low side switch 18 are connected in series between a converter power Vin and ground GND, and a PWM controller chip 12 is connected to the switches 14 and 18 to switch them to produce an output current I flowing through an inductor L connected to a phase node 16 between the switches 14 and 18 to charge a capacitor C to produce an output voltage Vout. When the voltage converter 10 starts up, an enable signal Ve is provided to the PWM controller chip 12 through an enable pin EN on the PWM controller chip 12 to enable the PWM controller chip 12. In the PWM controller chip 12, a comparator 122 serves as a power sensing arrangement, and has its non-inverting input connected to a pin OCSET on the PWM controller chip 12 to connect to the converter power Vin through a sense resistor $R_S$, and its inverting input connected with a reference Vinpor. When the voltage on the non-inverting input of the comparator 122 is equal to or higher than the reference Vinpor, it is determined that the converter power Vin is ready, and the comparator 122 produces an output PORE for the PWM controller chip 12 to generate signals Vc1 and Vc2 for two drivers 126 and 128 to switch the switches 14 and 18. To avoid the output current I to be so large to destroy the load circuit connected to the voltage converter 10, an over-current protection arrangement is included in the PWM controller chip 12, which comprises a comparator 124 having its non-inverting input connected to a pin PHASE on the PWM controller chip 12 to connect to the phase node 16, and its inverting input connected to the pin OCSET to connect to the converter power Vin through the sense resistor $R_S$, and a current source 129 connected between the inverting input of the comparator 124 and ground. When the voltage on the pin OCSET is lower than the voltage on the pin PHASE, it is determined that the output current I is greater than a predetermined threshold, and the comparator 124 will produce an over-current signal OC for over-current protection.

However, in the voltage converter 10, three pins EN, OCSET, and PHASE are required on the PWM controller chip 12 for accomplishing the enable function, power sensing function, and over-current protection function, which limits the minimized size of the PWM controller chip 12 and costs more for the package of the PWM controller chip 12. Moreover, the pin OCSET is connected to the converter power Vin through the sense resistor $R_S$, which requires the power sensing arrangement and over-current protection arrangement to use high voltage elements for implementing their circuits, thereby increasing the cost and complexity of the circuits.

Therefore, it is desired a low cost, simple, and reduced pin counts PWM controller chip for a voltage converter.

SUMMARY OF THE INVENTION

One object of the present invention is to provide a circuit and method for implementing a multi-function pin on a PWM controller chip in a voltage converter.

Another object of the present invention is to provide a low cost, simple, and reduced pin counts PWM controller chip for a voltage converter.

For a PWM controller chip in a converter to switch a pair of high side and low side switches connected with a phase node therebetween, according to the present invention, a circuit for implementing a multi-function pin on the PWM controller chip comprises a sense resistor connected between the multi-function pin and phase node, an enable arrangement for detecting a first voltage on the multi-function pin during the voltage converter starts up to produce a signal to enable the PWM controller chip, a power sensing arrangement for detecting a second voltage on the multi-function pin and a chip power during a period to identify if the converter power and chip power are ready, and an over-current protection arrangement for detecting a third voltage on the multi-function pin during the low side switch turns on to produce an over-current signal when the output current is higher than a threshold.

Since the enable function, power sensing function, and over-current protection function are accomplished by using only a multi-function pin, the pin counts of a PWM controller chip are reduced. Moreover, the multi-function pin is connected to the phase node, and therefore the power sensing arrangement and over-current protection arrangement may use low voltage elements for implementing their circuits to reduce the cost and complexity of the circuits. Further, a conventional voltage converter carries out the voltage detection for the over-current protection during the high side switch turns on, while a voltage converter of the present invention carries out the voltage detection for the over-current protection during the low side switch turns on. Generally, in a voltage converter, the duty of a high side switch is smaller than the duty of a low side switch, and therefore a voltage converter of the present invention has a longer time period for the over-current protection arrangement to detect the voltage on the multi-function pin, thereby increasing the noise immunity in the signal detection.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
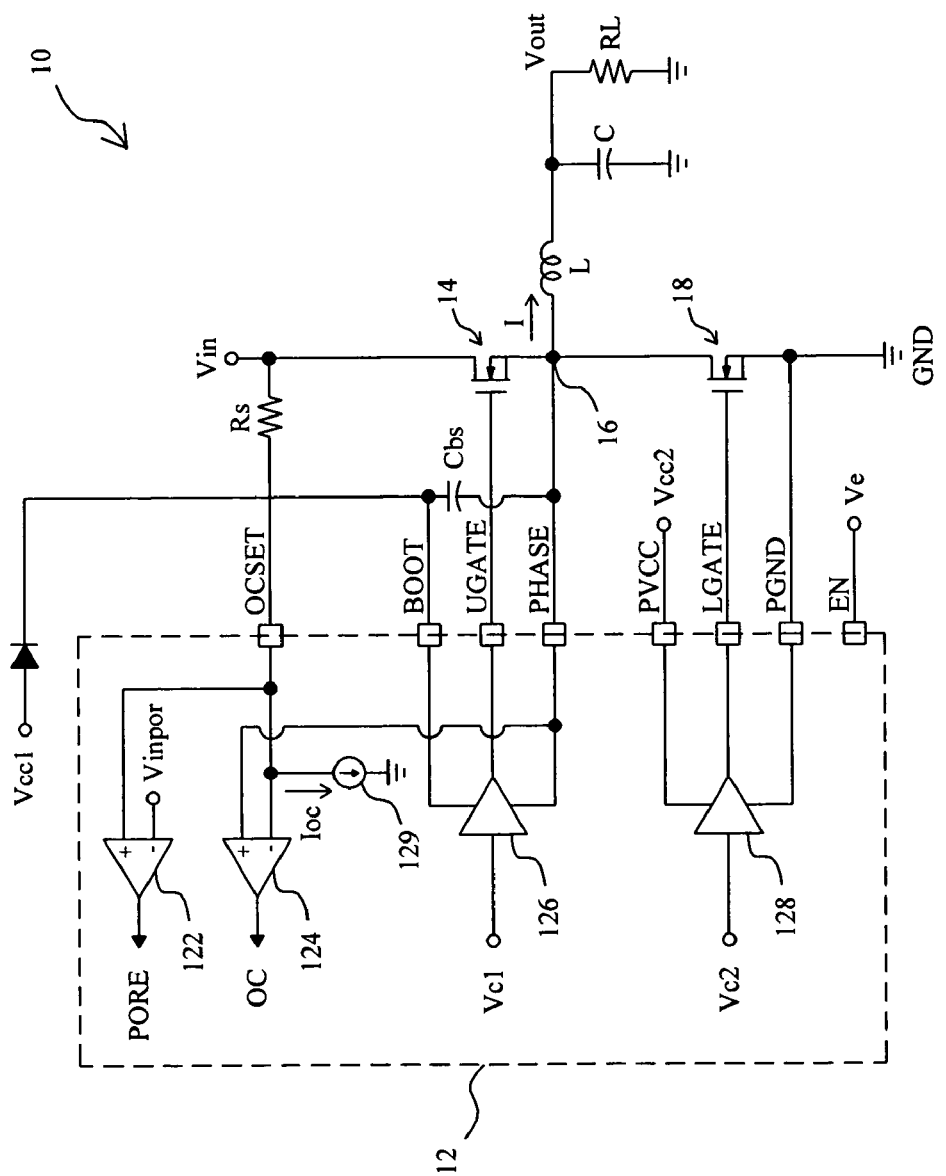
FIG. 1 shows a circuit diagram of a conventional voltage converter.
Figure 2:
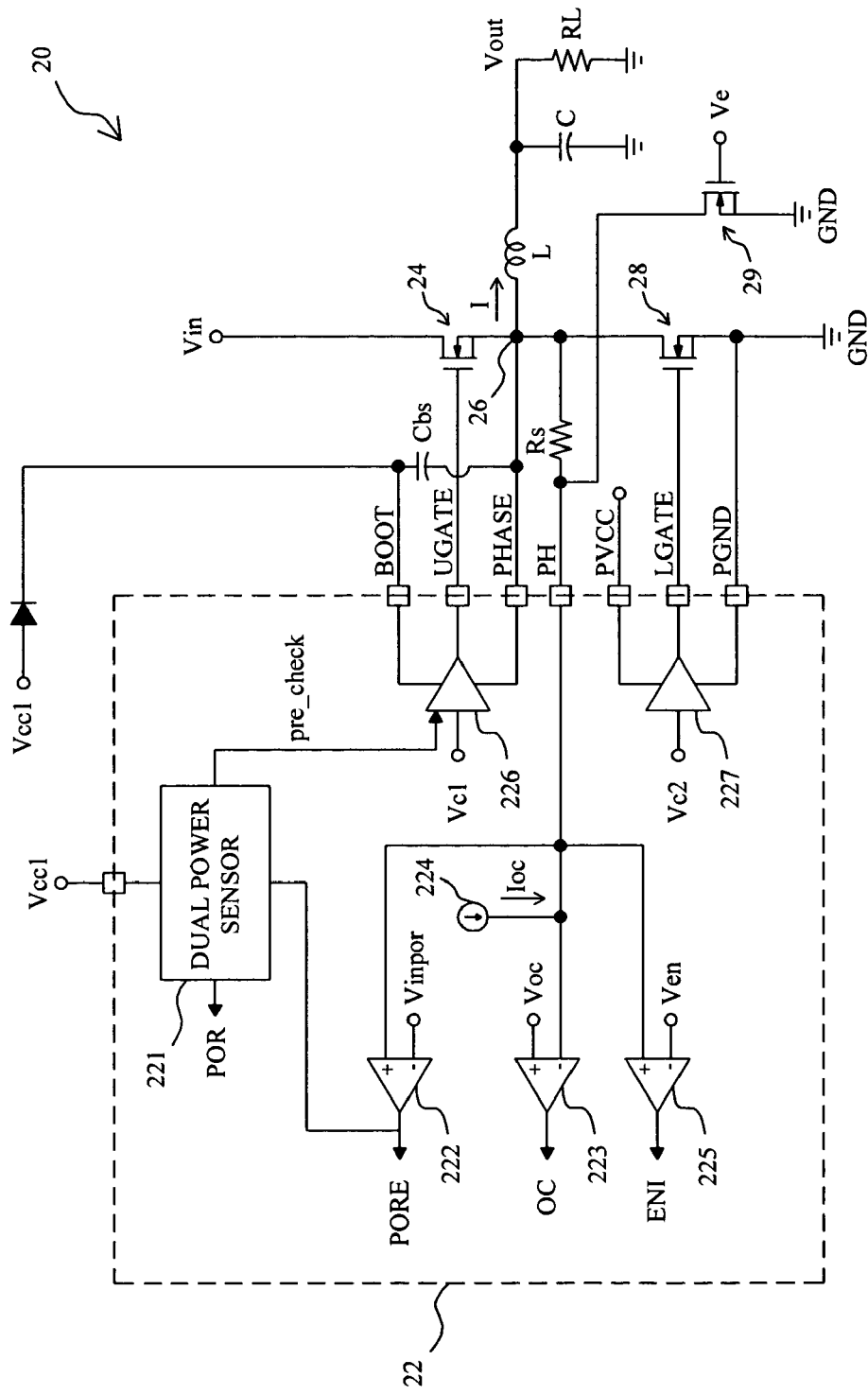
FIG. 2 shows a circuit diagram of a boost-strap voltage converter according to the present invention.

FIG. 2 shows a circuit diagram of a boost-strap voltage converter 20 according to the present invention, in which a PWM controller chip 22 is used to switch a pair of high side and low side switches 24 and 28 connected in series between a converter power Vin and ground GND to produce an output current I flowing through a phase node 26 between the switches 24 and 28 and an inductor L connected to the phase node 26 to charge a capacitor C to produce an output voltage Vout. The PWM controller chip 22 has a multi-function pin PH connected to the phase node 26 through a sense resistor $R_S$, and a transistor 29 is connected between the multi-function pin PH and ground GND. In the PWM controller chip 22, a dual power sensor 221 and a comparator 222 constitute a power sensing arrangement, a comparator 223 and a current source 224 constitute an over-current protection arrangement, and a comparator 225 in association with the transistor 29 outside the PWM controller chip 22 constitute an enable arrangement. For the enable function, the comparator 225 has its non-inverting input connected to the multi-function pin PH, and its inverting input connected with a reference Ven. During the voltage converter 20 starts up, an enable signal Ve is applied to the transistor 29 such that the voltage on the multi-function pin PH will be higher than the reference Ven, causing the comparator 225 to produce an output ENI to enable the PWM controller chip 22. After the PWM controller chip 22 is enabled, the output voltage Vout is still zero, and the drivers 226 and 227 for driving the switches 24 and 28 have no input signals thereto. At this time, the dual power sensor 221 detects the chip power Vcc1 and sends a signal pre_check to the driver 226 to force the high side switch 24 turned on for a period for the comparator 222 to compare the voltage on the multi-function pin PH with a reference Vinpor. If the voltage on the multi-function pin PH is higher than the reference Vinpor, it is determined that the converter power Vin is ready, and the comparator 222 will produce a corresponding output PORE to the dual power sensor 221. If the dual power sensor 221 also identifies that the chip power Vcc1 is ready, it will produce an output POR to indicate power ready, and the PWM controller chip 22 will generate signals Vc1 and Vc2 for the drivers 226 and 227 to switch the switches 24 and 28 to produce the output current I. For the over-current protection function, the comparator 223 has its non-inverting input connected with a reference Voc, and its inverting input connected to the multi-function pin PH, and the current source 224 supplies a current Ioc to the multi-function pin PH. During the low side switch 28 turns on, the voltage on the multi-function pin PH is compared with the reference Voc by the comparator 223. If the voltage on the multi-function pin PH is lower than the reference Voc, it is determined that the output current I is greater than a predetermined threshold, and the comparator 223 will produce an over-current signal OC to signal the PWM controller chip 22 to turn off the switches 24 and 28 or perform other operations for over-current protection.

Figure 3:
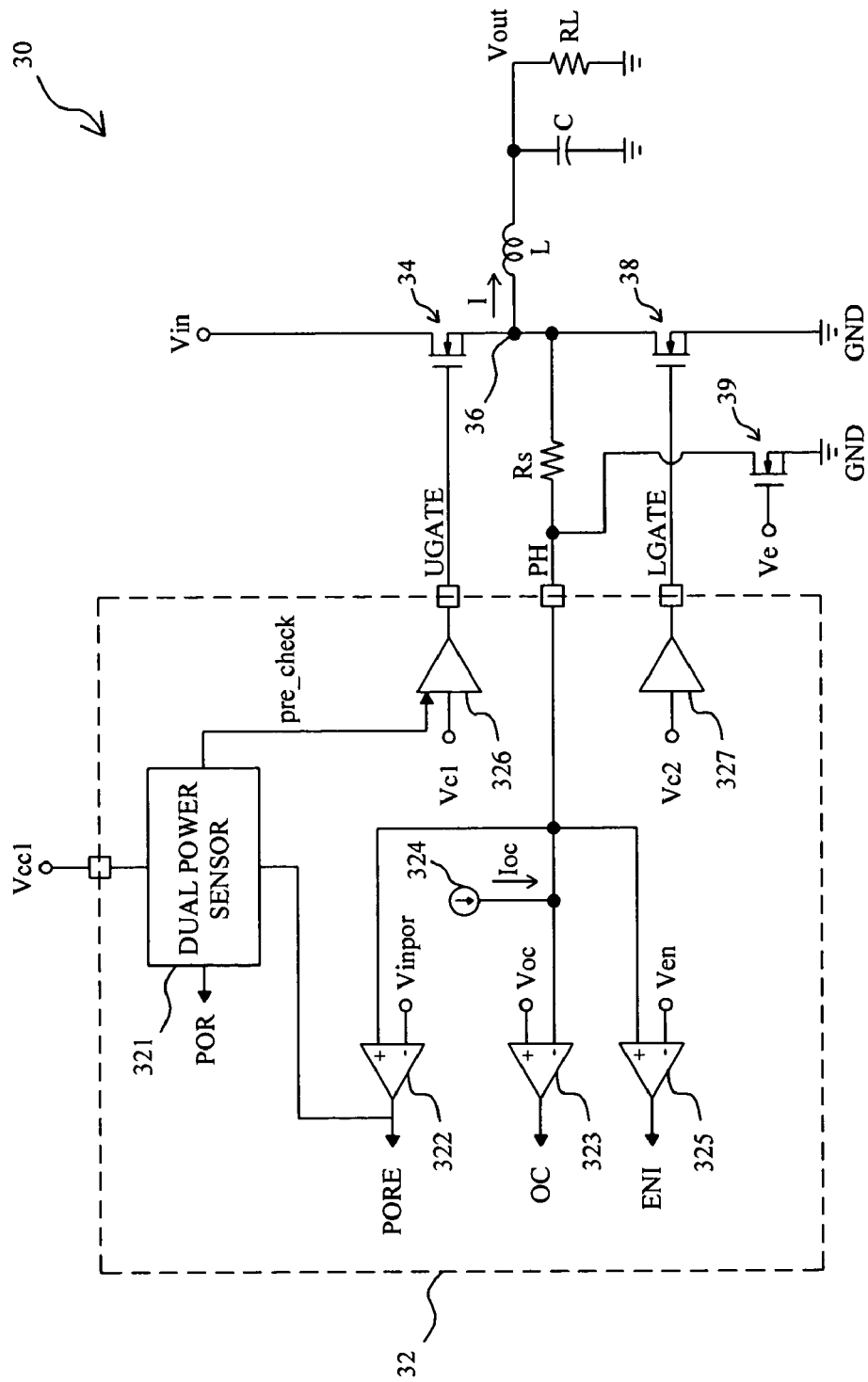
FIG. 3 shows a circuit diagram of a non-boost-strap voltage converter according to the present invention.

FIG. 3 shows a circuit diagram of a non-boost-strap voltage converter 30 according to the present invention, in which a PWM controller chip 32 is used to switch a pair of high side and low side switches 34 and 38 connected between a converter power Vin and ground GND to produce an output current I flowing through a phase node 36 between the switches 34 and 38 and an inductor L connected to the phase node 36 to charge a capacitor C to produce an output voltage Vout. The PWM controller chip 32 has a multi-function pin PH connected to the phase node 36 through a sense resistor $R_S$, and a transistor 39 is connected between the multi-function pin PH and ground GND. In the PWM controller chip 32, a dual power sensor 321 and a comparator 322 constitute a power sensing arrangement, a comparator 323 and a current source 324 constitute an over-current protection arrangement, and a comparator 325 in association with the transistor 39 outside the PWM controller chip 32 constitute an enable arrangement. When the voltage converter 30 is to be started up, an enable signal Ve is applied to the transistor 39 such that the voltage on the multi-function pin PH will be higher than a reference Ven provided for the inverting input of the comparator 325, and the comparator 325 compares the voltage on the multi-function pin PH with the reference Ven. If the voltage on the multi-function pin PH is higher than the reference Ven, the comparator 325 produces an output ENI to enable the PWM controller chip 32. After the PWM controller chip 32 is enabled, the output voltage Vout is still zero, and the drivers 326 and 327 for driving the switches 34 and 38 have no input signals thereto. At this time, the power sensing arrangement identifies if the converter power Vin and a chip power Vcc1 are ready. The dual power sensor 321 detects the chip power Vcc1 and sends a signal pre_check to the driver 326 to force the high side switch 34 turned on for a period for the comparator 322 to detect the voltage on the multi-function pin PH. If the voltage on the multi-function pin PH is higher than a reference Vinpor provided for the inverting input of the comparator 322, it is determined that the converter power Vin is ready, and the comparator 322 will produce a corresponding output PORE to the dual power sensor 321. If the power sensing arrangement identifies that both the converter power Vin and chip power Vcc1 are ready, the dual power sensor 321 produces an output POR to indicate power ready for the PWM controller chip 32, and the latter generates signals Vc1 and Vc2 for the drivers 326 and 327 to switch the switches 34 and 38 to produce the output current I. For the over-current protection function, the comparator 323 has its non-inverting input connected with a reference Voc, and its inverting input connected to the multi-function pin PH, and the current source 324 supplies a current Ioc to the multi-function pin PH. During the low side switch 38 turns on, the voltage on the multi-function pin PH is compared with the reference Voc by the comparator 323. If the voltage on the multi-function pin PH is lower than the reference Voc, it is determined that the output current I is greater than a predetermined threshold, and the comparator 323 will produce an over-current signal OC to signal the PWM controller chip 32 to turn off the switches 34 and 38 or perform other operations for over-current protection.

By using only a multi-function pin, a PWM controller chip of the present invention accomplishes the enable function, power sensing function, and over-current protection function, and therefore the pin counts of the PWM controller chip are reduced. Moreover, since the multi-function pin is connected to the phase node, low voltage elements may be used for the circuits of the power sensing arrangement and over-current protection arrangement, and therefore the cost and complexity of the circuits are reduced. Further, the voltage detection for the over-current protection is carried out during the low side switch turns on, and therefore a longer time period is available for the over-current protection arrangement to detect the voltage on the multi-function pin, thereby increasing the noise immunity in the signal detection.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A circuit for implementing a multi-function pin on a PWM controller chip in a voltage converter to switch a pair of high side and low side switches connected with a phase node therebetween to produce an output current from a converter power, the circuit comprising:
- a sense resistor connected between the multi-function pin and phase node;
- an enable arrangement for detecting a first voltage on the multi-function pin when the voltage converter starts up to enable the PWM controller chip;
- a power sensing arrangement for turning on the high side switch for a period and detecting a second voltage on the multi-function pin during the period and a chip power to identify if the converter power and chip power are ready; and
- an over-current protection arrangement for detecting a third voltage on the multi-function pin when the low side switch turns on to produce an over-current signal when the output current is greater than a threshold;
- the enablement, power sensing, and over-current protection arrangements each having an input coupled to the multi-function pin.

2. The circuit of claim 1, wherein the enable arrangement comprises:
- an enable switch connected to the multi-function pin for being applied with an enable signal such that the first voltage will be higher than a reference; and
- a comparator for producing a signal to enable the PWM controller chip by comparing the first voltage with the reference.

3. The circuit of claim 1, wherein the power sensing arrangement comprises:
- a comparator for comparing the second voltage with a reference during the period to produce a comparison signal; and
- a dual power sensor for supplying a signal to turn on the high side switch for the period, detecting the chip power to identify if the chip power is ready, and identifying if the converter power is ready based on the comparison signal.

4. The circuit of claim 1, wherein the over-current protection arrangement comprises:
- a current source for supplying a current to the multi-function pin; and
- a comparator for producing the over-current signal by comparing the third voltage with a reference when the low side switch turns on.

5. A method for implementing a multi-function pin on a PWM controller chip in a voltage converter to switch a pair of high side and low side switches connected with a phase node therebetween to produce an output current from a converter power, the method comprising the steps of:
- (a) connecting a sense resistor between the multi-function pin and phase node, and establishing enablement, power sensing, and over-current protection arrangements each having an input coupled to the multi-function pin;
- (b) detecting a first voltage on the multi-function pin when the voltage converter starts up for enabling the PWM controller chip;
- (c) turning on the high side switch for a period and detecting a second voltage on the multi-function pin during the period and a chip power for identifying if the converter power and chip power are ready; and
- (d) detecting a third voltage on the multi-function pin when the low side switch turns on for producing an over-current signal when the output current is greater than a threshold.

6. The method of claim 5, wherein the step (b) comprises:
applying an enable signal to an enable switch connected to the multi-function pin such that the first voltage will be higher than a reference; and
producing a signal for enabling the PWM controller chip by comparing the first voltage with the reference.

7. The method of claim 5, wherein the step (c) comprises:
detecting the chip power for identifying if the chip power is ready;
producing a signal for turning on the high side switch for the period;
comparing the second voltage with a reference during the period for generating a comparison signal; and
determining if the converter power is ready based on the comparison signal.

8. The method of claim 5, wherein the step (d) comprises:
supplying a current to the multi-function pin; and
producing the over-current signal by comparing the third voltage with a reference when the low side switch turns on.

9. The circuit of claim 1, wherein an over-current protection threshold level is determined by the sense resistor.

10. The method of claim 5, wherein an over-current protection threshold level is determined by the sense resistor.

* * * * *